US008953135B2

(12) United States Patent
Lee et al.

(10) Patent No.: US 8,953,135 B2
(45) Date of Patent: Feb. 10, 2015

(54) DISPLAY APPARATUS

(75) Inventors: Seung-Kyu Lee, Suwon-si (KR); Chul-Ho Kim, Yongin-si (KR); Kyung-Min Park, Yongin-si (KR); Kyung-Hoon Kim, Uiwang-si (KR); Jin-Suk Park, Seoul (KR)

(73) Assignee: Samsung Display Co., Ltd. (KR)

( * ) Notice: Subject to any disclaimer, the term of this patent is extended or adjusted under 35 U.S.C. 154(b) by 1115 days.

(21) Appl. No.: 12/703,730

(22) Filed: Feb. 10, 2010

(65) Prior Publication Data

US 2010/0253610 A1 Oct. 7, 2010

(30) Foreign Application Priority Data

Apr. 1, 2009 (KR) ........................ 10-2009-0028178

(51) Int. Cl.
*G02F 1/1345* (2006.01)
*G09G 3/36* (2006.01)

(52) U.S. Cl.
CPC ...... *G09G 3/3611* (2013.01); *G09G 2300/0426* (2013.01); *G09G 2320/0223* (2013.01); *G09G 3/3648* (2013.01)
USPC ............................ 349/151; 349/149; 349/152

(58) Field of Classification Search
USPC .................................................. 349/149–152
See application file for complete search history.

(56) References Cited

U.S. PATENT DOCUMENTS

| | | | | |
|---|---|---|---|---|
| 7,102,721 B2 * | 9/2006 | Ueda et al. | ..................... | 349/152 |
| 7,705,952 B2 * | 4/2010 | Lee et al. | ..................... | 349/151 |
| 8,188,607 B2 * | 5/2012 | Lin et al. | ..................... | 257/786 |
| 2007/0002243 A1 * | 1/2007 | Kim | ..................... | 349/139 |
| 2007/0030409 A1 * | 2/2007 | Aoki | ..................... | 349/56 |
| 2007/0085963 A1 * | 4/2007 | Huang et al. | ..................... | 349/152 |
| 2007/0146611 A1 * | 6/2007 | Kang | ..................... | 349/149 |
| 2008/0143945 A1 * | 6/2008 | Jeong et al. | ..................... | 349/139 |
| 2010/0171687 A1 * | 7/2010 | Chiang et al. | ..................... | 345/98 |

FOREIGN PATENT DOCUMENTS

| | | |
|---|---|---|
| JP | 2001-154218 | 8/2001 |
| KR | 10-1999-0054284 A | 7/1999 |
| KR | 10-2008-0056037 A | 6/2008 |

* cited by examiner

*Primary Examiner* — Charles Chang
(74) *Attorney, Agent, or Firm* — Innovation Counsel LLP

(57) ABSTRACT

A display apparatus comprises a first thin film transistor (TFT) and a second TFT which are disposed in a display area. A first signal transmission line is disposed in a peripheral area surrounding the display area and is electrically connected to the first TFT. A second signal transmission line adjacent to the first signal transmission line is electrically connected to the second TFT. In a first portion of the peripheral area, the first signal transmission line is parallel to the second signal transmission line and is spaced by a first gap from the second signal transmission line. In a second portion of the peripheral area, the first signal transmission line is parallel to the second signal transmission line and is spaced by a second gap from and the second signal transmission line. The second gap is greater than the first gap. Other features are also provided.

16 Claims, 8 Drawing Sheets

DISPLAY APPARATUS

CROSS-REFERENCE TO RELATED APPLICATION

This application claims priority from Korean Patent Application No. 10-2009-0028178 filed on Apr. 1, 2009 in the Korean Intellectual Property Office, the disclosure of which is incorporated herein by reference in its entirety.

BACKGROUND OF THE INVENTION

1. Field of the Invention

The present invention relates to signal transmission lines in a display apparatus. The display apparatus can be a liquid crystal display.

2. Description of the Related Art

Currently, liquid crystal displays (LCDs) are some of the most widely used flat panel display (FPD) devices. An LCD has two substrates with field-generating electrodes. A liquid crystal layer is interposed between the substrates. Voltages are applied to the electrodes to rearrange the liquid crystal molecules, thereby controlling the amount of light transmitted by the liquid crystal layer.

One of the two substrates may be a display substrate having gate lines and data lines crossing each other to define a plurality of pixels. The other one of the two substrates is an “opposite” substrate facing the display substrate. A liquid crystal layer is interposed between the display substrate and the opposite substrate. The LCD may have driver chips connected to the display substrate to drive the display apparatus.

In a display apparatus used in small- and medium-sized products, driver chips may be disposed at the upper or lower sides of the display substrate next to the ends of the data lines. As a result, the display apparatus may become longer in the up-and-down direction. However, in recently developed electronic devices such as digital still cameras (DSC), a new design is employed in which operation buttons are placed at a lateral side of the display unit. The driver chips are disposed at the left or right side of the display substrate next to the ends of the gate lines.

While the LCD resolution is gradually increasing, there is still a demand for making the LCD small. Both of these trends lead to increased density of internal signal lines needed to drive the LCD. As the distance between adjacent internal signal lines decreases, LCD failures become more likely. Accordingly, new designs are needed to space the signal lines farther apart to reduce failures. Further, it is desirable to reduce the difference in resistance between different signal lines in order to reduce signal skew.

SUMMARY

Some embodiments of the present invention provide a display apparatus with reduced rate of failures and a reduced resistance deviation between signal lines. The invention is defined by the appended claims, which are incorporated into this section by reference.

According to an aspect of the present invention, there is provided a display apparatus comprising: a first thin film transistor (TFT) and a second TFT which are disposed in a display area of the display apparatus; a first signal transmission line disposed in a peripheral area surrounding the display area, the first signal transmission line being electrically connected to the first TFT for transmitting signals to the first TFT; and a second signal transmission line adjacent to the first signal transmission line and electrically connected to the second TFT for transmitting signals to the second TFT, wherein in a first portion of the peripheral area, the first signal transmission line is parallel to the second signal transmission line and is spaced by a first gap from the second signal transmission line, in a second portion of the peripheral area, the first signal transmission line is parallel to the second signal transmission line and is spaced by a second gap from and the second signal transmission line, wherein the second gap is greater than the first gap.

Other features are described below. The invention is defined by the appended claims.

BRIEF DESCRIPTION OF THE DRAWINGS

The above and other features and advantages of some embodiments of the present invention will become more apparent by a description below which refers to the attached drawings in which.

DETAILED DESCRIPTION OF SOME EMBODIMENTS

Figure 1:
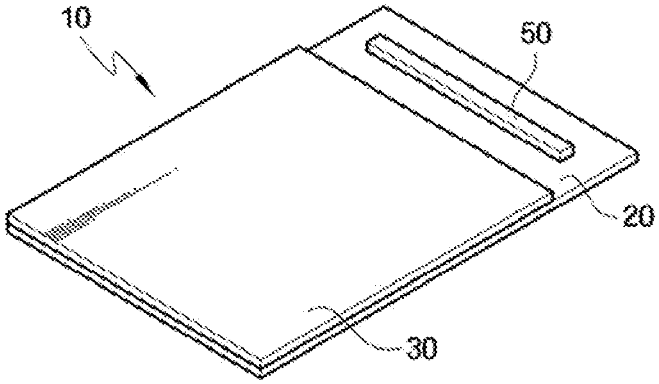
FIG. 1 is a perspective view of a display apparatus according to some embodiments of the present invention.

Advantages and features of some embodiments of the present invention may be understood more readily by reference to the following detailed description of some embodiments and the accompanying drawings. The present invention may, however, be embodied in many different forms and should not be construed as being limited to the embodiments set forth herein. Rather, these embodiments are illustrative, while the invention is defined by the appended claims. In the drawings, the sizes and relative sizes of layers and regions may be exaggerated for clarity.

It will be understood that when an element or layer is referred to as being “on”, “connected to”, or “coupled to” another element or layer, then intervening elements may or may not be present. In contrast, when an element is referred to as being “directly on,” “directly connected to”, or “directly coupled to” another element or layer, then there are no intervening elements or layers. Like numbers refer to like elements throughout.

Spatially relative terms, such as “below”, “beneath”, “lower”, “above”, “upper”, and the like, may be used herein for ease of description to describe one feature’s relationship to another as illustrated in the figures. It will be understood that the spatially relative terms are not intended to limit the orientation of any device in operation unless stated otherwise. For example, a device may be turned upside down relative to the depiction in the figures, or may be operated in some other orientation.

The illustrations in the figures are schematic and are not meant to convey every detail. The actual shapes may very, for example, due to manufacturing techniques and/or tolerances.

Exemplary embodiments of the present invention will now be explained in detail with reference to the accompanying drawings.

Figure 2:
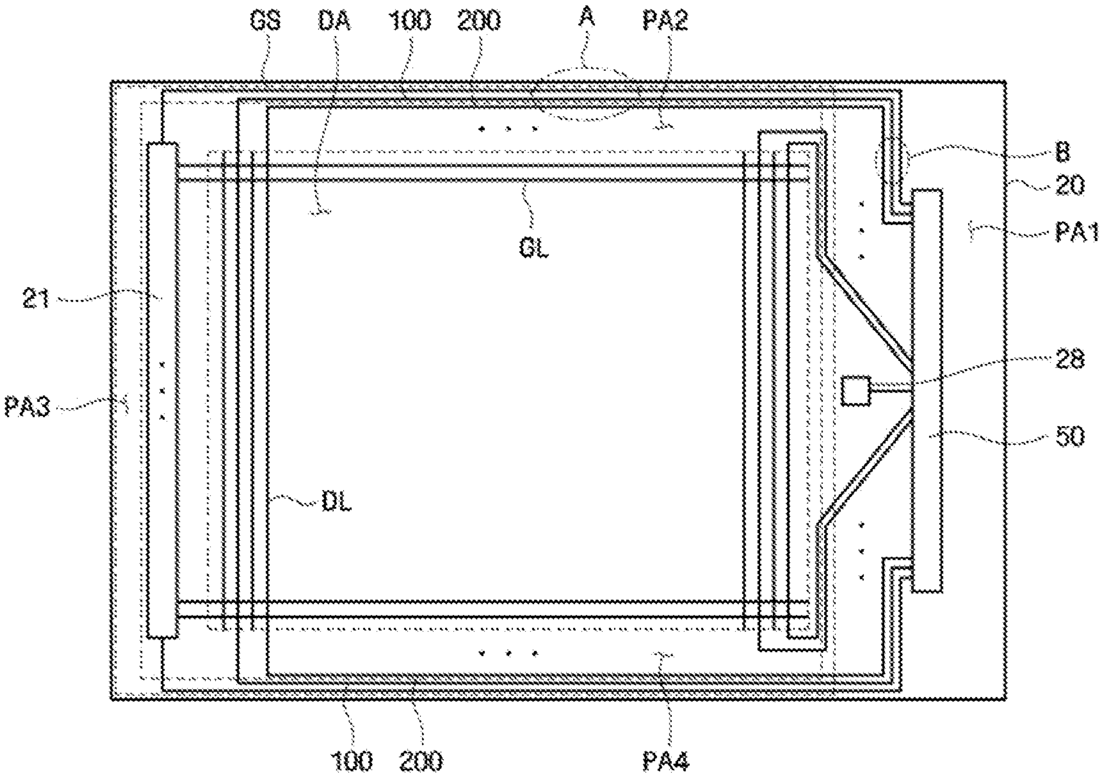
FIG. 2 is a plan view of a display substrate shown in FIG. 1.

FIG. 1 is a perspective view of a display apparatus according to some embodiments of the present invention, and FIG. 2 is a plan view of a display substrate shown in FIG. 1.

Referring to FIGS. 1 and 2, the display apparatus 10 includes the display substrate 20, an opposite substrate 30 opposite to the display substrate 20, liquid crystal disposed between the display substrate 20 and the opposite substrate 30, a seal line (not shown) used to attach the display substrate 20 to the opposite substrate 30, and a driver chip 50. The display apparatus 10, as shown in FIG. 2, includes a display area DA displaying an image, and first, second, third and fourth peripheral areas PA1, PA2, PA3, and PA4 surrounding the display area DA.

The display substrate 20 includes a plurality of gate lines GL extending in a first direction and a plurality of data lines DL extending in a second direction substantially perpendicular to the first direction. The gate and data lines GL and DL are formed in the display area DA. The data lines DL are formed on a gate insulating layer (not shown). The gate insulating layer insulates the data lines DL from the gate lines GL.

A thin film transistor (TFT) (not shown) may be formed at each crossing of a gate line GL with a data line DL. Each TFT includes a gate electrode connected to the corresponding gate line GL, a source electrode connected to the corresponding data line DL, and a drain electrode connected to a corresponding pixel electrode. When a gate signal is applied to the gate electrode of the TFT through the corresponding gate line GL, the TFT is turned on, and consequently a data signal applied to the source electrode of the TFT through the corresponding data line DL is transmitted to the pixel electrode.

Each gate line GL has a first end adjacent to the first peripheral area PA1 and has a second end opposite to the first end and adjacent to the third peripheral area PA3. Each data line DL has a first end adjacent to the second peripheral area PA2 and has a second end opposite to the first end and adjacent to the fourth peripheral area PA4. In the view of FIG. 2, the first peripheral area PA1 is disposed on the right side of the display area DA, the third peripheral area PA3 is on the left side of the display area DA, the second peripheral area PA2 is on the upper side of the display area DA, and the fourth peripheral area PA4 is on the lower side of the display area DA. Therefore, the first, second, third and fourth peripheral areas PA1, PA2, PA3, and PA4 surround the display area DA. Each peripheral area has an elongated shape, and the first and third peripheral areas PA1 and PA3 are perpendicular to the second and fourth peripheral areas PA2 and PA4. Each of the second and fourth peripheral areas PA2 and PA4 is longer than each of the first and third peripheral areas PA1 and PA3. In particular, the second and fourth peripheral areas PA2 and PA4 are defined by the longer sides of the display substrate 20, while the first and third peripheral areas PA1 and PA3 are defined by shorter sides of the display substrate 20.

The display substrate 20 may further include a gate driving circuit 21 formed in the third peripheral area PA3. The gate driving circuit 21 includes a shift register with a plurality of driving transistors. The gate driving circuit 21 may be formed simultaneously with the gate lines GL, the data lines DL, and the thin film transistors by thin film processes. See e.g. U.S. patent application Ser. No. 12/029,767 filed by Ji-Suk Lim on Feb. 12, 2008, published as no. 2008/0284969 A1 on Nov. 20, 2008, assigned to Samsung Electronics Co., Ltd., incorporated herein by reference. The gate driving circuit 21 sequentially outputs the gate-on signal to the gate lines in response to a gate control signal from the driver chip 50. The gate driving circuit 21 may also be formed in the first peripheral area PA1.

The driver chip 50 is formed in the first peripheral area PA1 of the display substrate 20. Placing the driver chip 50 in the first peripheral area PA1, at the right side of the display substrate 20, allows one to achieve size reduction of the second peripheral area PA2 and/or the fourth peripheral area PA4 at the upper or lower sides of the display substrate 20.

The driver chip 50 outputs various signals for driving the display apparatus 10 in response to various control signals received from an exterior device. For example, the driver chip 50 outputs the data signals applied to the data lines DL, the gate control signal applied to the gate driving circuit 21, and a common voltage applied to the opposite substrate 30.

The display substrate 20 includes first data signal transmission lines 100 and second data signal transmission lines 200 which transmit the data signals from the driver chip 50 to the data lines DL.

The display substrate 20 may include a short point 28 for transmitting the common voltage from the driver chip 50 to the common electrode (not shown). The short point 28 is electrically connected to the common electrode (not shown) on the opposite substrate 30 using a conductive material. In this way, the common voltage output by the driver chip 50 is transmitted to the opposite substrate 30.

Figure 3:
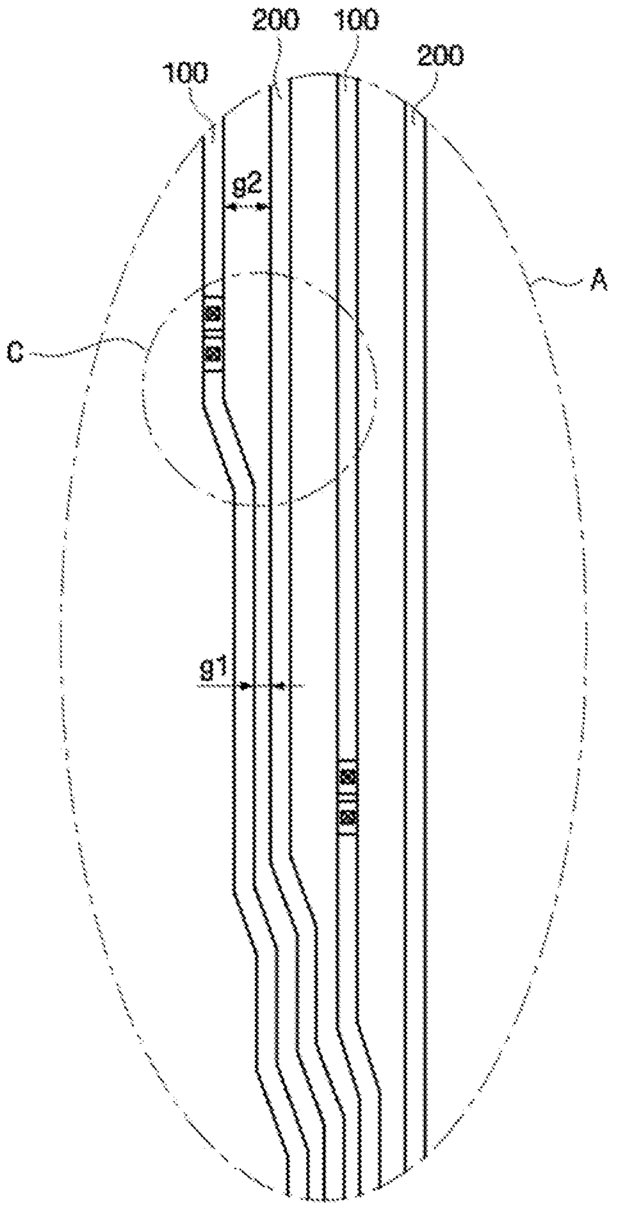
FIG. 3 is an enlarged view of a portion “A” of FIG. 2.
Figure 4:
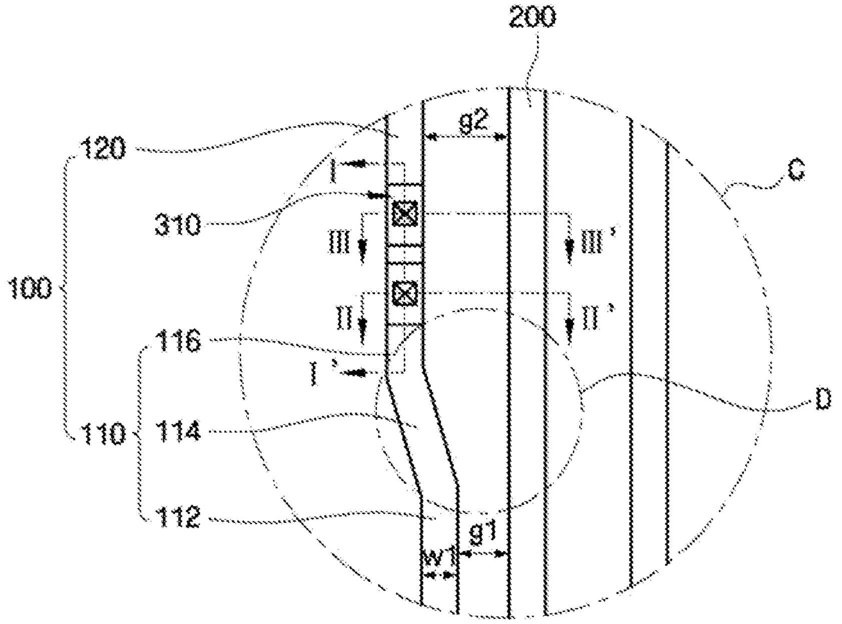
FIG. 4 is an enlarged view of a portion “C” of FIG. 3.
Figure 5:
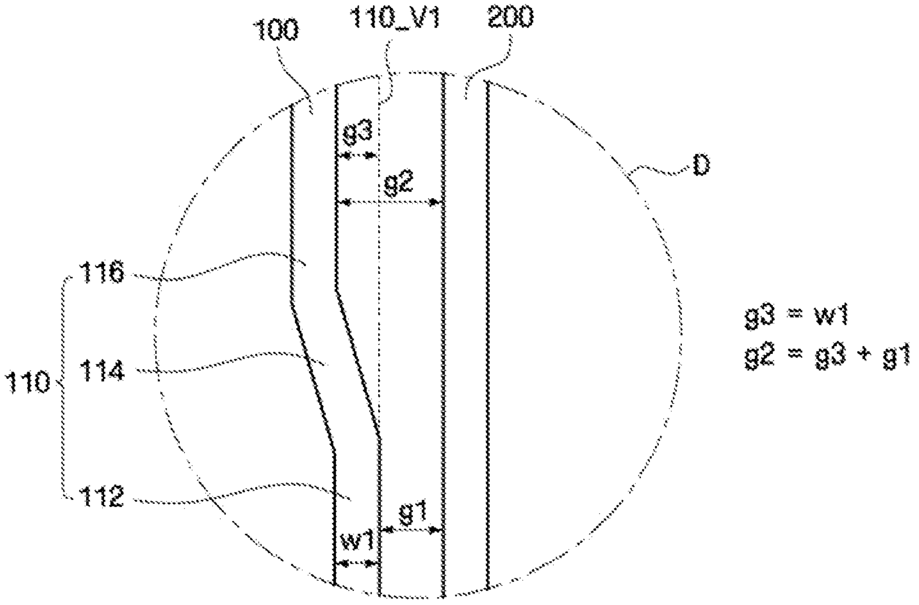
FIG. 5 is a first enlarged view of a portion “D” of FIG. 4 according to some embodiments of the present invention.
Figure 6:
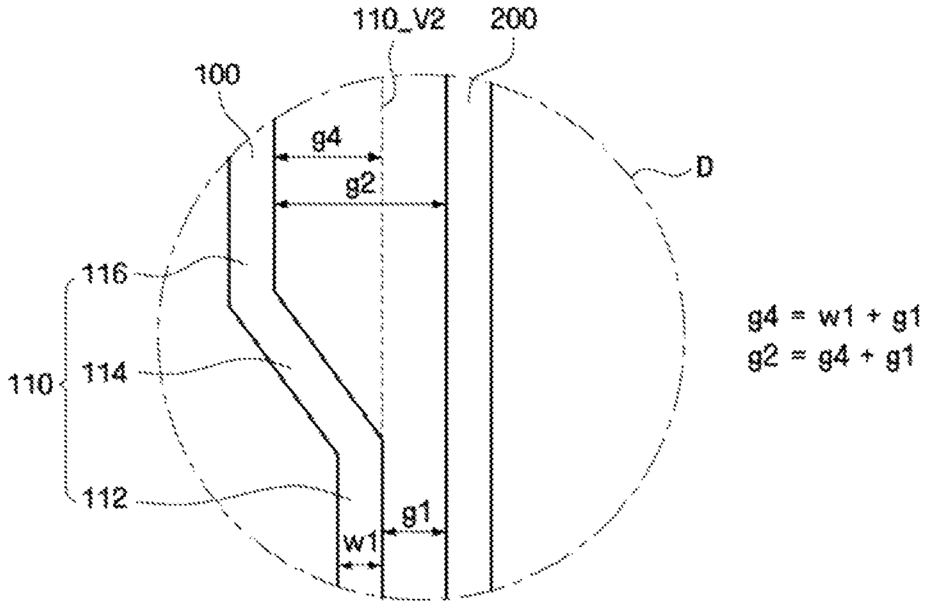
FIG. 6 is a second enlarged view of the portion “D” of FIG. 4 according to other embodiments of the present invention.
Figure 7:
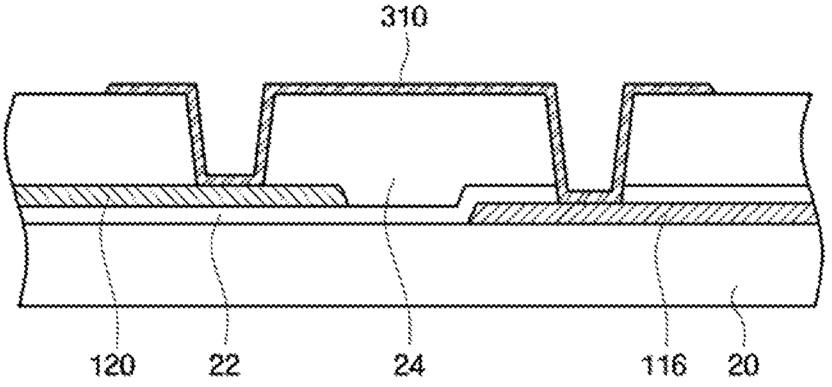
FIG. 7 is cross-sectional view taken along the line I-I' of FIG. 4.
Figure 8:
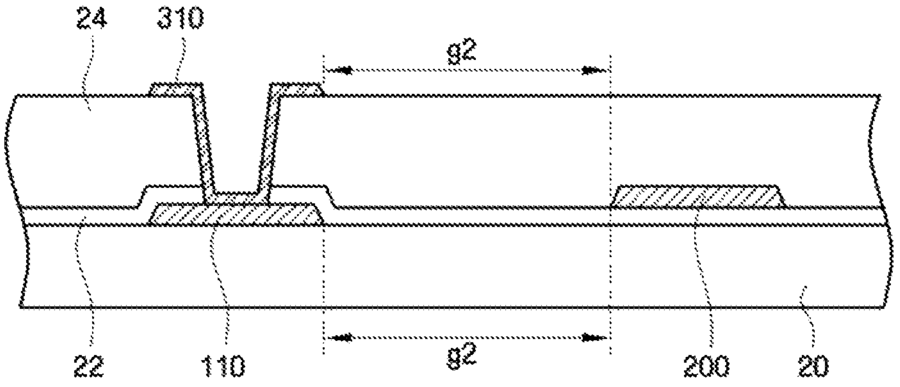
FIG. 8 is cross-sectional view taken along the line II-IP of FIG. 4.
Figure 9:
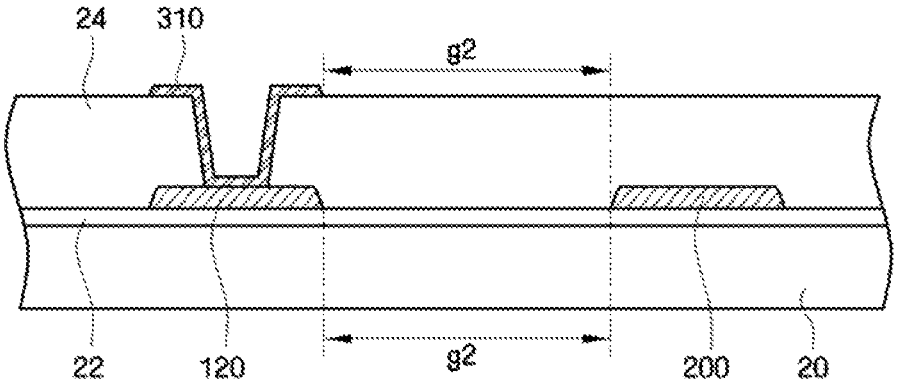
FIG. 9 is cross-sectional view taken along the line III-III' of FIG. 4.

FIGS. 2-9 illustrate signal lines formed in the fan-out part in the second peripheral area PA2. (The peripheral areas PA1, PA2, PA3, PA4 are "non-display" areas because they contain no pixels and because, therefore, no image is displayed in these areas.) FIG. 3 is an enlarged view of a portion "A" of FIG. 2, FIG. 4 is an enlarged view of a portion "C" of FIG. 3, FIG. 5 is a first enlarged view of a portion "D" of FIG. 4, FIG. 6 is a second enlarged view of the portion "D" of FIG. 4, FIG. 7 is cross-sectional view taken along the line I-I' of FIG. 4, FIG. 8 is cross-sectional view taken along the line II-IF of FIG. 4, and FIG. 9 is cross-sectional view taken along the line III-III' of FIG. 4.

Referring to FIGS. 1 through 9, the data lines DL are connected to the driver chip 50 by the first data signal transmission lines 100 and the second data signal transmission lines 200 which extend from the first peripheral area PA1 to the second peripheral area PA2 or the third peripheral area PA3. The data lines DL connect the respective first and second data signal transmission lines 100, 200 to the respective TFTs formed in the display area DA.

FIGS. 3-9 illustrate the second peripheral area PA2. In each of FIGS. 3-6, the display area DA is not shown but is assumed to be to the left of each figure, and the first peripheral area PA1 is therefore below the figure. Each of the first and second data signal transmission lines connects the driver chip 50 to a respective data line DL. The first and second data signal transmission lines 100 alternate with the second data signal transmission lines 200. At least near the driver chip 50, the first data signal transmission lines 100 are made of a different layer than the second data signal transmission lines 200 to reduce the spacing between the adjacent first and second data signal transmission lines.

The first data signal transmission lines 100 and the second data signal transmission lines 200 are generally parallel to each other and run along the length direction of the first peripheral area PA1. The first data signal transmission lines 100 and the second data signal transmission lines 200 form a pattern of pairs of adjacent lines. In each pair, a first data signal transmission line 100 is to the left of the corresponding second data signal transmission line 200. The pairs repeat in the second peripheral area PA2. In each pair, the first data signal transmission line 100 is closer to the display area DA than the second data signal transmission line 200.

For example, if the rows of the display area DA extend along the longer side of the display substrate 20, and each row has n pixels (not shown), and all of the first and second data signal transmission lines 100, 200 are located in the peripheral area PA2, then there are a total of n/2 pairs of the first and second data signal transmission lines 100, 200.

Some of the first data signal transmission lines 100 and the second data signal transmission lines 200 may be formed in the fourth peripheral area PA4. For example, the first data signal transmission lines 100 and the second data signal transmission lines 200 formed in the second peripheral area PA2 may be connected to the even-numbered data lines DL, and the first data signal transmission lines 100 and the second data signal transmission lines 200 formed in the fourth peripheral area PA4 may be connected to the odd-numbered data lines DL, or vice versa. If each row of pixels in the display area DA contains n pixels (not shown), then each of the second and fourth peripheral areas PA2, PA4 may contain n/4 pairs of the first data signal transmission lines 100 and the second data signal transmission lines 200.

Each of FIGS. 3-10 illustrates one pair of the first and second data signal transmission lines 100, 200. The remaining pairs may be similar. As shown in FIG. 3, in each pair, the gap (the spacing) between the first data signal transmission line 100 and the second data signal transmission line 200 varies in width, and may have different values g1 and g2 at different locations. In this example, the "second gap" g2 is wider than the "first gap" g1, for the reason described below.

Referring to FIG. 4, the first data signal transmission line 100 includes a first segment 110 consisting of a first linear segment 112, a connecting segment 114, and a second linear segment 116.

In this embodiment, the first linear segment 112 extends in the general direction ("length direction") of the first data signal transmission line 100.

The connecting segment 114 meets the first linear segment 112. In this embodiment, the connecting segment 114 may be a straight-line segment extending obliquely at a predetermined angle with respect to the general direction of the first data signal transmission line 100 (and hence with respect to the first linear segment 112).

The second linear segment 116 meets the connecting segment 114. In this embodiment, the second linear segment 116 may extend obliquely at a predetermined angle with respect to the connecting segment 114. In particular, the second linear segment 116 may extend in the same direction as (i.e. may be parallel to) the first linear segment 112. Therefore, the first segment 110 may generally extend in the length direction of the first data signal transmission line 100.

The first linear segment 112 and the second linear segment 116 are not straight-line extensions of each other due to the oblique position of the connecting segment 114 located between the first linear segment 112 and the second linear segment 116. In other words, the first linear segment 112 is shifted sideways relative to the second linear segment 116 by an amount determined by the connecting segment 114. ("Sideways" means the direction perpendicular to the first linear segment 112.) Therefore, the first linear segment 112 and the second linear segment 116 are not straight-line extensions of each other. Of note, due to the position of the connecting segment 114, the second linear segment 116 is closer to the display area DA than the first linear segment 112.

The sideways shift such as provided by the connecting segment 114 (or 214 of FIG. 13) may also be provided in the second data signal transmission line 200, and is possible for the following reason.

Each data signal transmission line 100, 200 (e.g. a "kth" data signal transmission line) present in the second peripheral area PA2 extends in the length direction of the second peripheral area PA2 to the position adjacent to the corresponding data line DL, and then turns left, towards the display area DA to connect to the data line DL. Therefore, a portion of the second peripheral area PA2 (the portion located past the data line DL) is free of the kth data signal transmission line. As a result, that portion has an unoccupied area whose width is equal to the width of the kth data signal transmission line plus the distance between the kth data signal transmission line and the next, (k+1)th data signal transmission line to the right. This unoccupied area can accommodate the sideway shift of the (k+1)th data signal transmission line.

The distance between the (k+1)th data signal transmission line and the (k+2)th data signal transmission line can therefore be increased by forming the connecting segment 114 in the (k+1)th data signal transmission line. Since the distance between the two neighboring signal lines is increased, failures in the fan-out part due to a narrow gap between the neighboring signal lines can be reduced.

The amount of the sideway shift obtained by means of the connecting segment 114 will now be described with reference to FIGS. 5 and 6.

Referring to FIG. 5, the first linear segment 112 has a width w1. The second linear segment 116 may have the same width w1 as the first linear segment 112.

Consider a virtual straight line 110_v1 extending from a first side of the first linear segment 112, the first side being adjacent to the second signal transmission line 200. Since the second linear segment 116 extends in the same direction as the first linear segment 112, the virtual line 110_v1 may extend in parallel with the second linear segment 116.

Due to the connecting segment 114, there is a "third" gap g3 between the virtual line 110_v1 and the second linear segment 116. The third gap g3 may be equal to the width w1 of the first linear segment 112. In other words, the connecting segment 114 may be positioned so that the third gap g3 between the virtual line 110_v1 and the second linear segment 116 is equal to the width w1 of the first linear segment 112, that is, g3=w1.

As described above, the gap between the first data signal transmission line 100 and the second signal transmission line 200 is increased by the connecting segment 114. More particularly, the connecting segment 114 causes the spacing between the first data signal transmission line 100 and the second signal transmission line 200 to increase from the first gap value g1 at the position of the first linear segment 112 to the second gap value g2 at the position of the second linear segment 116. For example, the second gap g2 may be equal to the sum of the first gap g1 and the third gap g3, that is, g2=g3+g1.

For example, in some embodiments, the width w1 of the first linear segment 112 and the first gap g1 are 3 μm and 2.75 μm, respectively. The third gap g3 provided by the connecting segment 114 may be 3 μm. In this case, the second gap g2 will be 5.75 μm. That is to say, the gap between the first data signal transmission line 100 and the second signal transmission line 200 is increased about two time by the connecting segment 114, thereby reducing the risk of failures in the fan-out part.

FIG. 6 shows other possible dimensions. FIG. 6 shows a virtual line 110_v2 extending from the first side of the first linear segment 112, the first side being adjacent to the second signal transmission line 200. Since the second linear segment 116 extends in the same direction as the first linear segment 112, the virtual line 110_v2 may extend in parallel with the second linear segment 116.

Due to the connecting segment 114, there is a "fourth" gap g4 between the virtual line 110_v2 and the second linear segment 116. The fourth gap g4 may be equal to the sum of the width w1 of the first linear segment 112 and the first gap g1. In other words, the connecting segment 114 is positioned so that the fourth gap g4 between the virtual line 110_v2 and the second linear segment 116 is equal to the sum of the width w1 of the first linear segment 112 and the first gap g1, that is, g4=w1+g1.

As described above, the gap between the first data signal transmission line 100 and the second signal transmission line 200 is increased by the connecting segment 114. That is to say, the first linear segment 112 of the first data signal transmission line 100 is spaced by the first gap g1 from the second signal transmission line 200. However, the second linear segment 116 of the first data signal transmission line 100 is spaced by the second gap g2 from the second signal transmission line 200, and due to the position of the connecting segment 114 the second gap g2 is greater than the first gap g1. In this embodiment, the second gap g2 may be equal to the sum of the fourth gap g4 and the first gap g1, that is, g2=g4+g1.

For example, in some embodiments, the width w1 of the first linear segment 112 and the first gap g1 are 3 μm and 2.75 μm, respectively. The fourth gap g4 provided by the connecting segment 114 may be 5.75 μm. In this case, the second gap g2 will be 8.5 μm. That is to say, the gap between the first data signal transmission line 100 and the second signal transmission line 200 is increased about three times by the connecting segment 114, thereby reducing failures in the fan-out part.

Referring to FIGS. 4 and 7, in one or more pairs (possibly all pairs) of the first and second data signal transmission lines 100 and 200, the first data signal transmission line 100 includes a second segment 120 and a first bridge pattern 310.

The second segment 120 may be formed of the same layer as the data lines DL. That is to say, the second segment 120 may be formed on the gate insulating layer 22, of the same material and at the same time as the data lines DL. More particularly, like the data lines DL, the second segment 120 may have a single- or multi-layer structure formed of aluminum (Al), chromium (Cr), copper (Cu), molybdenum (Mo), or tungsten (W), or a multi-layer structure formed of a combination these metals. The second segment 120 may be formed of a refractory metal such as molybdenum (Mo), chromium (Cr), tantalum (Ta), or titanium (Ti), or an alloy thereof, and may have a multi-layer structure having a refractory metal layer (not shown) and a low-resistance conductive layer (not shown). Exemplary multi-layer structures include a two-layer film with a lower layer of chromium or molybdenum or their alloys and an upper layer of aluminum or its alloy; and a three-layer film with a lower layer of molybdenum or its alloy, an intermediate layer of aluminum or its alloy, and an upper layer of molybdenum or its alloy. The second linear segment 116 of the first segment 110 may be formed of the same layer as the gate lines GL. More particularly, the second linear segment 116 may be formed directly on the display substrate 20, of the same material and at the same time as the gate lines GL. In particular, like the gate lines GL, the second linear segment 116 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), titanium (Ti), tantalum (Ta), or the like. Also, the second linear segment may also have a multi-layer structure having two conductive layers (not shown) with different physical properties.

Since the second linear segment 116 is continuous with the connecting segment 114, which is continuous with the first linear segment 112, it may be expedient to make the connecting segment 114 and the first linear segment 112 at the same time and of the same material as the gate lines GL, like the second linear segment 116. That is to say, the first segments 110 and the gate lines GL may be formed of the same layer using the same material.

In some embodiments, in pair of the first and second data signal transmission lines 100 and 200, a portion of the first data signal transmission line 200 adjacent to the first segment 100 is made of the same layer as the data lines DL, and the first segment 110 is made of the same layer as the gate lines GL. Using the different layers allows one to reduce the spacing between the first and second data signal transmission lines 100, 200. The gate lines GL are typically formed from a higher-resistivity material than the data lines DL. If the entire first data signal transmission lines 100 were made of the same layer as the gate lines GL, then there would be a significant signal skew between the data signals transmitted via the first data signal transmission lines 100 and the data signals transmitted via the second data signal transmission lines 200. In order to avoid this, the second segments 120 are made of the same material as the data lines DL. In each first data signal transmission line 100, the second segment 120 extends to the corresponding data line DL, and is connected to the second linear segment 116 of the first segment 110 by the first bridge pattern 310. The first bridge patterns 310 may be formed at the same time as the pixel electrodes (not shown). The pixel electrodes are formed in the display area DA. Thus, in some embodiments, each first bridge pattern 310 is formed on a passivation layer 24 and is connected to the corresponding second linear segment 116 of the first segment 110 and to the corresponding second segment 120 through corresponding contact holes.

Since the first bridge patterns 310 are formed at the same time as the pixel electrodes, the first bridge patterns 310 may be made of the same material as the pixel electrodes, that is, a transparent conductive material such as indium tin oxide (ITO), indium zinc oxide (IZO), or zinc oxide (ZnO).

Referring to FIGS. 4 and 8, the first bridge pattern 310 is spaced by the second gap g2 from the second signal transmission line 200. As described above, the second gap g2 is equal to the sum of the third gap (g3 of FIG. 5) or the fourth gap (g4 of FIG. 6) with the first gap (g1 of FIG. 5 or 6).

Referring to FIGS. 4 and 9, the second segment 120 is spaced by the second gap g2 from the second signal transmission line 200. Of note, the second segment 120 may be formed of the same layer as the portion of the second signal transmission line 200 adjacent to the second segment 120. This layer may be formed on the gate insulating layer 22. The data lines DL may be formed of the same layer.

Figure 10:
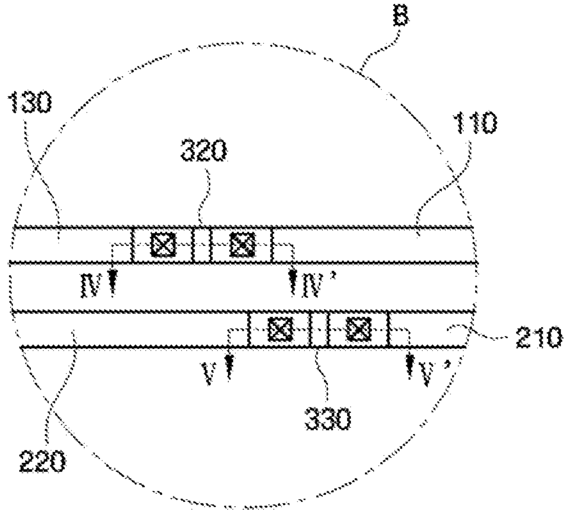
FIG. 10 is an enlarged view of a portion “B” of FIG. 2.
Figure 11:
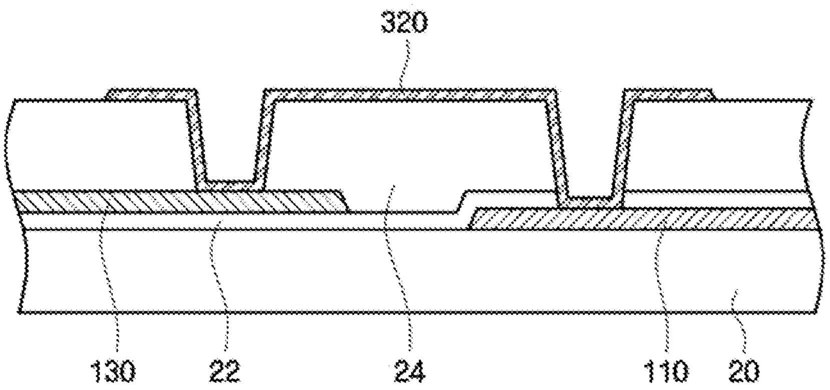
FIG. 11 is cross-sectional view taken along the line IV-IV' of FIG. 10.
Figure 12:
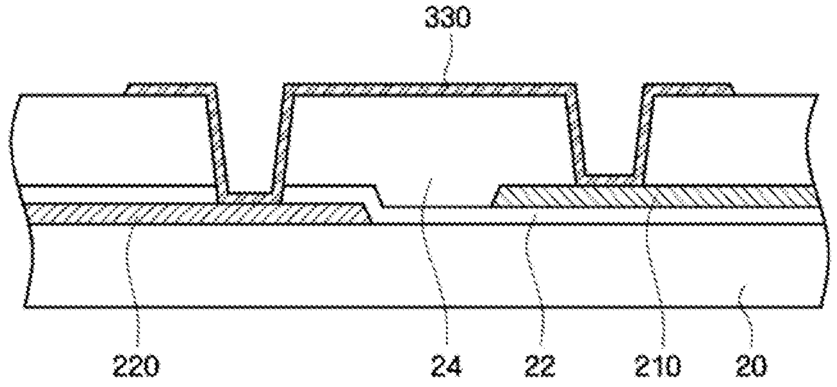
FIG. 12 is cross-sectional view taken along the line V-V' of FIG. 10.

Signal transmission lines formed in the fan-out part of the first peripheral area PA1 will now be described with reference to FIGS. 2 and 10 through 12. FIG. 10 is an enlarged view of a portion "B" of FIG. 2. FIG. 11 is a cross-sectional view taken along the line IV-IV' of FIG. 10, and FIG. 12 is a cross-sectional view taken along the line V-V' of FIG. 10.

Figure 13:
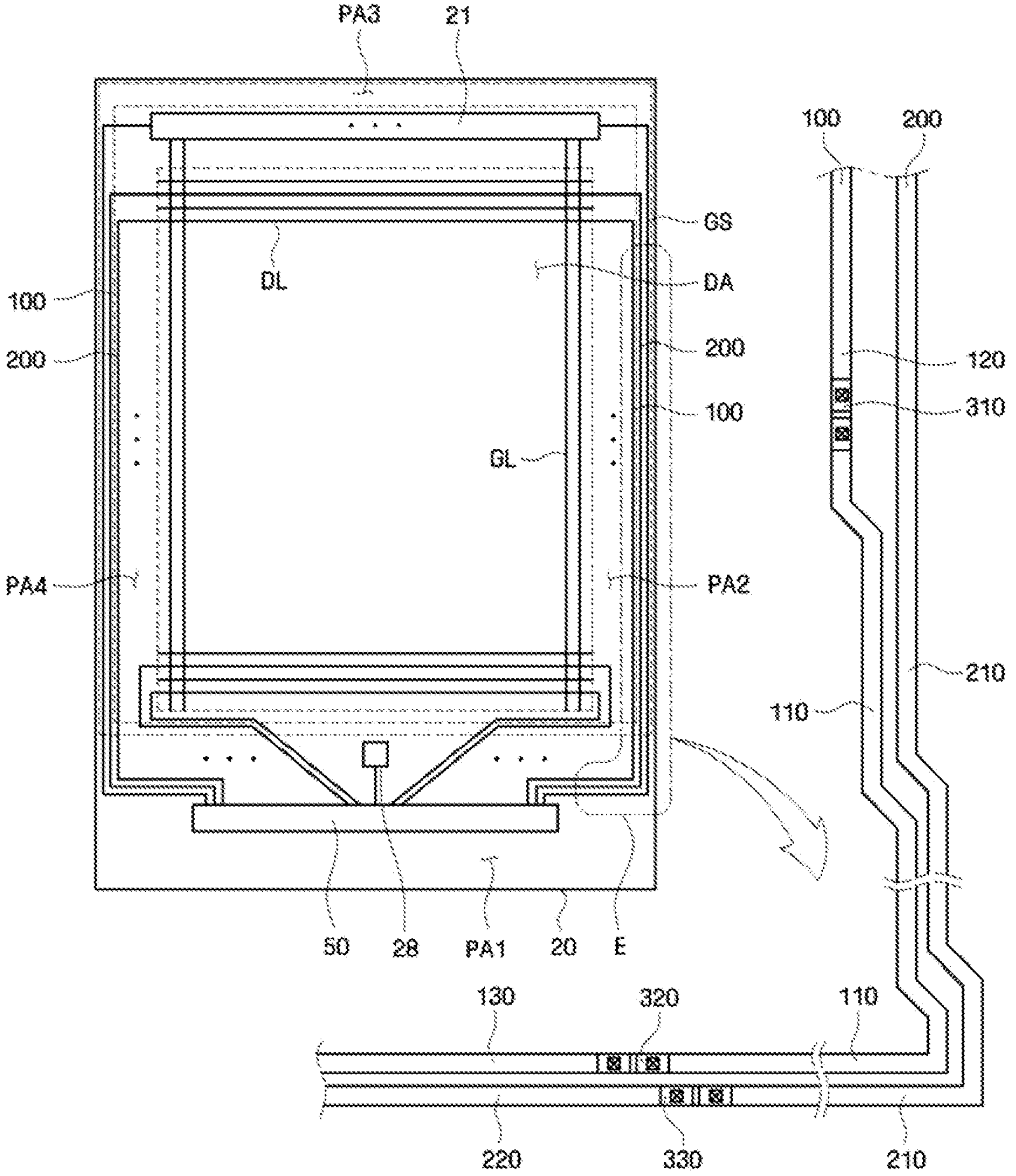
FIG. 13 illustrates the plan view of the display substrate shown in FIG. 1 and an enlarged view of a portion “E” shown in the plan view.

Referring to FIGS. 2, 10 and 11, each first data signal transmission line 100 further includes a third segment 130 and a second bridge pattern 320. In the view of FIG. 10, the third segment 130 extend to the left to connect to the driver chip 50, as shown in FIG. 13 discussed below.

Each third segment 130 is formed in the first peripheral area PA1 of the display substrate 20. Each first segment 110 is disposed in the first peripheral area PA1 and the second peripheral area PA2.

The third segments 130 may be formed of a different layer than the first segments 110. As described above, the first segments 110 may be formed of the same layer as the gate lines GL. In this case, the third segments 130 may be formed of the same layer as the data lines DL. Thus, the third segments 130 may be formed on the gate insulating layer 22 simultaneously with, and of the same layer and the same material as, the data lines DL.

In each first data signal transmission line 100, the first segment 110 and the third segment 130 are formed of different layers and are electrically connected to each other by the corresponding second bridge pattern 320. The second bridge patterns 320 will not be described in detail because they are similar to the first bridge patterns 310.

Referring to FIGS. 2, 10 and 12, each second signal transmission line 200 includes a fourth segment 220, a fifth segment 210 and a third bridge pattern 330.

Each fourth segment 220 is disposed in the first peripheral area PA1 of the display substrate 20, and extends to the driver chip 50. Each fifth segment 210 is disposed in the first peripheral area PA1 and the second peripheral area PA2.

The fourth segments 220 may be formed of a different layer than the fifth segments 210. For example, the fourth segments 220 may be formed of the same layer as the gate lines GL. Thus, the fourth segments 220 and the gate lines GL may be simultaneously formed of the same layer and the same material. The fifth segments 210 may be formed of the same layer as the data lines DL. Thus, the fifth segment 210 may be formed on the gate insulating layer 22 simultaneously with, and of the same layer and the same material as, the data lines DL.

In each second data signal transmission line 200, the fourth segment 220 and the fifth segment 210 are formed of different layers and are electrically connected to each other by the corresponding third bridge pattern 330. The third bridge patterns 330 will not be described in detail since they are similar to the first bridge patterns 310.

FIG. 13 provides an overall view of the connection relationship between the first and the second data signal transmission lines 100 and 200 formed in the fan-out parts of the first and the second peripheral areas PA1 and PA2. FIG. 13 illustrates the plan view of the display substrate shown in FIG. 1 and an enlarged view of a portion "E" of the plan view. In some embodiments, all the first and second data signal transmission lines 100, 200 have a segment structure shown in FIG. 13. In other embodiments, some of the first and second data signal transmission lines 100, 200 may have a different segment structure.

In FIG. 13, the first data signal transmission line 100 includes the first segment 110, the second segment 120, the third segment 130, the first bridge pattern 310 and the second bridge pattern 320. The third segment 130 is formed in the first peripheral area PA1 and extends to, and is connected to, the driver chip 50. The first segment 110 is present in the first peripheral area PA1 and the second peripheral area PA2 and extends to, and is connected to, the third and the second segments 130 and 120. The second segment 120 is formed in the second peripheral area PA2 and extends to, and is connected to, the corresponding data line DL of the display area DA.

The third segment 130 is formed of the same layer as the data lines DL, the first segment 110 is formed of the same layer as the gate lines GL, and the second segment 120 is formed of the same layer as the data lines DL. The third segment 130 and the first segment 110 are interconnected by the second bridge pattern 320. The first segment 110 and the second segment 120 are interconnected by the first bridge pattern 310.

The second signal transmission line 200 of FIG. 13 includes the fourth segment 220, the fifth segment 210 and the third bridge pattern 330. The fourth segment 220 is formed in the first peripheral area PA1 and extends to, and is connected to, the driver chip 50. The fifth segment 210 is present in the first peripheral area PA1 and the second peripheral area PA2 and extends to, and is connected to, the fourth segment 220 at one end and the corresponding data line DL of the display area DA at the other end.

The first segment 110 and the fifth segment 210 extend to the corresponding data lines DL and are formed of the same layer as the data lines DL.

The fourth segment 220 is formed of the same layer as the gate lines GL, and the fifth segment 210 is formed of the same layer as the data lines DL. The fourth segment 220 and the fifth segment 210 are interconnected by the third bridge pattern 330.

The third segment 130 and the fourth segment 220 are adjacent to each other but are formed from different layers to enable reduced spacing therebetween. Likewise, the first segment 110 and the fifth segment 210 are adjacent to each other but are formed from different layers to enable reduced spacing therebetween. Further, the third segment 130 and the first segment 110 are formed of different layers, and the fourth segment 220 and the fifth segment 210 are formed of different layers. The lengths of the third, first, fourth and fifth segments 130, 110, 220, 210 are chosen to compensate for the length difference between the first data signal transmission line 100 and the second data signal transmission line 200 so as to reduce the resistance difference between the two lines. As a result, the resistance difference between the first data signal transmission line 100 and the second data signal transmission line 200 can be fairly small. Accordingly, the signal skew between different pixels in the display area DA can be reduced.

The embodiments described above illustrate but do not limit the present invention. Other embodiments and variations are within the scope of the invention, as defined by the appended claims.

What is claimed is:

1. A display apparatus comprising:

a first thin film transistor (TFT) and a second TFT which are disposed in a display area of the display apparatus;

a first signal transmission line disposed in a peripheral area surrounding the display area, the first signal transmission line being electrically connected to the first TFT for transmitting signals to the first TFT; and a second signal transmission line adjacent to the first signal transmission line and electrically connected to the second TFT for transmitting signals to the second TFT, wherein in a first portion of the peripheral area, the first signal transmission line is parallel to the second signal transmission line and is spaced by a first gap from the second signal transmission line; in a second portion of the peripheral area, the first signal transmission line is parallel to the second signal transmission line and is spaced by a second gap from and the second signal transmission line, wherein the second gap is greater than the first gap, wherein the first signal transmission line includes a first segment including: a first linear segment, a connecting segment extending from the first linear segment, and a second linear segment extending from the connecting segment, wherein the first linear segment and the second linear segment are not straight-line extensions of each other, wherein the first signal transmission line further includes a second segment and a first bridge pattern, the second segment and the first segment are formed of different materials, and the second segment and the first segment physically contact the first bridge pattern and are interconnected by the first bridge pattern, and wherein the first bridge pattern is spaced by the second gap from the second signal transmission line.

2. The display apparatus of claim 1, wherein the connecting segment is positioned so that a third gap between a virtual line extending from one side of the first linear segment and the second linear segment is equal to a width of the first linear segment.

3. The display apparatus of claim 2, wherein the second gap is equal to the sum of the third gap and the first gap.

4. The display apparatus of claim 1, wherein the connecting segment is positioned so that a fourth gap between a virtual line extending from one side of the first linear segment and the second linear segment is equal to the sum of the width of the first linear segment and the first gap.

5. The display apparatus of claim 4, wherein the second gap is equal to the sum of the fourth gap and the first gap.

6. The display apparatus of claim 1, wherein the second segment is spaced by the second gap from the second signal transmission line.

7. The display apparatus of claim 6, wherein the second segment is formed of the same material as the second signal transmission line adjacent to the second segment.

8. The display apparatus of claim 1, wherein the first bridge pattern is made of a transparent conductive material.

9. The display apparatus of claim 1, further comprising a driver chip, wherein the peripheral area has a first area and a second area orthogonal to the first area, and the driver chip is formed in the first area.

10. The display apparatus of claim 9, wherein a length of the second area is greater than that of the first area.

11. A display apparatus comprising:

a first thin film transistor (TFT) and a second TFT which are disposed in a display area of the display apparatus;

a first signal transmission line disposed in a peripheral area surrounding the display area, the first signal transmission line being electrically connected to the first TFT for transmitting signals to the first TFT;

a second signal transmission line adjacent to the first signal transmission line and electrically connected to the second TFT for transmitting signals to the second TFT; and a driver chip, wherein the peripheral area has a first area and a second area orthogonal to the first area, and the driver chip is formed in the first area, wherein in a first portion of the peripheral area, the first signal transmission line is parallel to the second signal transmission line and is spaced by a first gap from the second signal transmission line; in a second portion of the peripheral area, the first signal transmission line is parallel to the second signal transmission line and is spaced by a second gap from and the second signal transmission line, wherein the second gap is greater than the first gap, wherein the first signal transmission line includes a first segment including: a first linear segment, a connecting segment extending from the first linear segment, and a second linear segment extending from the connecting segment, wherein the first linear segment and the second linear segment are not straight-line extensions of each other, and wherein the first signal transmission line further includes a second segment disposed in the first area, and the first segment is present in the first area and the second area.

12. The display apparatus of claim 11, wherein the first signal transmission line further includes a second bridge pattern, the second segment and the first segment are formed of different materials, and the first segment and the second segment physically contact the second bridge pattern and are interconnected by the second bridge pattern.

13. The display apparatus of claim 12, wherein the second bridge pattern is made of a transparent conductive material.

14. A display apparatus comprising:

a first thin film transistor (TFT) and a second TFT which are disposed in a display area of the display apparatus;

a first signal transmission line disposed in a peripheral area surrounding the display area, the first signal transmission line being electrically connected to the first TFT for transmitting signals to the first TFT;

a second signal transmission line adjacent to the first signal transmission line and electrically connected to the second TFT for transmitting signals to the second TFT; and a driver chip, wherein the peripheral area has a first area and a second area orthogonal to the first area, and the driver chip is formed in the first area, wherein in a first portion of the peripheral area, the first signal transmission line is parallel to the second signal transmission line and is spaced by a first gap from the second signal transmission line; in a second portion of the peripheral area, the first signal transmission line is parallel to the second signal transmission line and is spaced by a second gap from and the second signal transmission line, wherein the second gap is greater than the first gap, wherein the first signal transmission line includes a first segment including: a first linear segment, a connecting segment extending from the first linear segment, and a second linear segment extending from the connecting segment, wherein the first linear segment and the second linear segment are not straight-line extensions of each other, and wherein the second signal transmission line further includes a second segment and a third segment, the second segment is disposed in the first area, and the third segment is present in the first area and the second area.

15. The display apparatus of claim 14, wherein the second signal transmission line further includes a third bridge pattern, the second segment and the third segment are formed of different materials, and the second segment and the third segment physically contact the third bridge pattern and are interconnected by the third bridge pattern.

16. The display apparatus of claim 15, wherein the third bridge pattern is made of a transparent conductive material.

* * * * *